W. H. HARRIS.
BAKERS' PAN.

No. 178,144.  Patented May 30, 1876.

WITNESSES.
C. H. Woodward
T. H. Parsons

William Henry Harris,
INVENTOR, By
J. R. Drake, Atty.

UNITED STATES PATENT OFFICE.

WILLIAM H. HARRIS, OF BUFFALO, NEW YORK, ASSIGNOR TO J. W. RUGER & CO., OF SAME PLACE.

IMPROVEMENT IN BAKERS' PANS.

Specification forming part of Letters Patent No. 178,144, dated May 30, 1876; application filed January 7, 1876.

*To all whom it may concern:*

Be it known that I, WILLIAM HENRY HARRIS, of Buffalo, in the county of Erie and State of New York, (assignor to the firm of J. W. RUGER & Co., of same place,) have made certain Improvements in Bakers' Pans, of which the following is a specification:

The invention consists of a baker's pan constructed of a frame having turned-over flanges at its bottom, between which are confined the wires forming the bottom, in combination with plates riveted over the wires forming the bottom, at each corner of the frame, as will be more fully hereinafter described.

Figure 1:
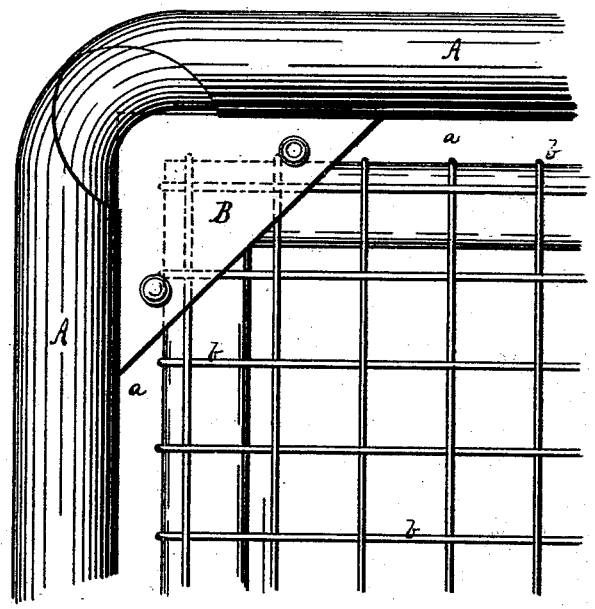
Figure 2:
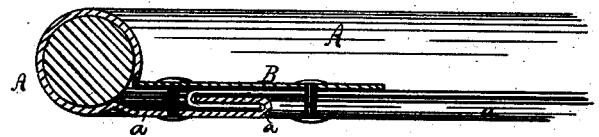

In the drawings, Figure 1 is an elevation of a portion of, or one corner of, the pan, showing the frame and wire-cloth, and the corner-fastening. Fig. 2 is an enlarged detail, showing the arrangement of wires under the flange.

In the ordinary pan the wire-cloth is secured to the frame by riveting a strip of sheet-iron over the edge of the wires; but when the wires sag down from use they pull out, except where the rivets hold, and thus make the surface very uneven in a short time, making the pan worthless.

To obviate this difficulty I turn the inner edge $a$ of the frame A over upon itself, and bend the ends of the wires $b\ b$ underneath the fold, and thus hold each wire by itself. This equalizes the strain or bearing upon the wire-cloth, and distributes the tension over the whole length of the frame.

B is an angular-shaped piece riveted in each corner of the frame, to give additional strength to the corners, as well as to hold the fold of the frame, and prevent it from being pulled up and the wires loosened.

The stiffening of the corners to keep the pan in shape and the method of fastening the wire bottom are important for the reasons stated.

I claim—

The corner-stiffening pieces B B, in combination with the frame A, flanges $a\ a$, and wires $b\ b$, as and for the purpose specified.

In witness whereof I have hereunto signed my name in the presence of two subscribing witnesses.

WM. H. HARRIS.

Witnesses:
J. R. DRAKE,
J. W. RUGER.